Patented Aug. 9, 1927.

1,638,492

UNITED STATES PATENT OFFICE.

NAPOLEON ARTHUR LAURY, OF ROCKVILLE CENTER, NEW YORK.

METHOD FOR THE PRODUCTION OF ANHYDROUS SODIUM BISULPHITE.

No Drawing.  Application filed August 16, 1923. Serial No. 657,801.

My invention relates to the production of commercial anhydrous sodium bi-sulphite, a substance which is also sometimes called meta bi-sulphite of sodium, and is known in commerce as A. B. S.

Heretofore it has been common practice to make this substance by what may be termed a wet process in accordance with which a solution or emulsion of sodium carbonate is saturated with sulphur burner gas, and the salt then separated out and dried.

The object of my present invention is to make commercial anhydrous sodium bi-sulphite of high quality, but by a more economical process than that now in use.

I have found it impossible to obtain satisfactory results from subjecting dry commercial sodium salts, such as sodium carbonate, to the action of sulphur burner gases containing, as they do, only a relatively small percentage of $SO_2$, say 10%, because of the fact that the oxygen in the gas changes much of the product to sodium sulphate. However, I have discovered that under suitable conditions the subjection of such dry commercial sodium carbonate to the action of substantially 100% $SO_2$ results in a high yield of commercial anhydrous sodium bi-sulphite of excellent quality, according to the formula—

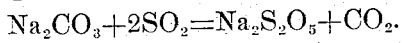
$$Na_2CO_3 + 2SO_2 = Na_2S_2O_5 + CO_2.$$

Of course if other sodium salts are used instead of sodium carbonate the formula will be changed accordingly.

Thus my process consists, in general, of the production of commercial anhydrous sodium bi-sulphite by subjecting a dry commercial sodium salt, such as commercial sodium carbonate, to the action of substantially pure sulphur dioxide.

In carrying out this process, some provision must be made to control the temperature for otherwise the temperature will rise rapidly and as a result the mass may change completely to free sulphur, thiosulphate and other compounds. This temperature control may be effected either by water-cooling the walls of the reaction vessel, or by admitting the $SO_2$ gas at such a rate that the temperature does not rise to the point where the anhydrous sodium bi-sulphite begins to decompose. I prefer the latter method. My experience leads me to believe that the most complete conversion is obtained at a temperature of about 100° F.

It is desirable also that the sodium salts should be constantly agitated and uniformly exposed to the action of the gas. To this end I preferably employ as a reaction vessel a rotating cylinder in which the sodium salts rest and at one end of which the $SO_2$ gas enters.

In the operation of my process as above described the sodium salt (for example commercial soda ash) is placed in the cylinder which is rotated. $SO_2$ gas of substantially 100% purity is then admitted at one end of the cylinder at a rate such that the temperature within the cylinder does not rise unduly. The rotation of the cylinder keeps the material within it constantly agitated and uniformly exposed to the entering gas.

At first all of the $SO_2$ gas is absorbed and only the acid anhydride ($CO_2$ in case sodium carbonate is the salt used), escapes through the opposite end of the cylinder. As the mass approaches saturation the excess of $SO_2$ also passes out. This, along with whatever acid anhydride may be present, is admitted to an absorbing tower where it is recovered with water, the acid anhydride ($CO_2$) going through to the air or being recovered separately.

The dry commercial sodium salts contain sufficient traces of moisture to facilitate the reactions above described.

By my method herein described it is apparent that I am enabled to produce economically and efficiently high grade commercial anhydrous sodium bi-sulphite.

The terms of expression which I have employed are used as terms of description and not as limitation, and I have no intention in the use of such terms and expressions, of excluding any equivalent of the features shown and described or portions thereof, but recognize that various modifications are possible within the scope of the invention claimed.

What I claim is:

1. The method of producing commercial anhydrous sodium bi-sulphite, which consists in subjecting commercial sodium carbonate to the action of substantially pure sulphur dioxide in the presence of a trace of moisture.

2. The method of producing commercial anhydrous sodium bi-sulphite, which consists in subjecting commercial sodium carbonate in substantially dry form to the action of substantially pure sulphur dioxide and simultaneously maintaining the temperature of the mass below the temperature at which anhydrous sodium bi-sulphite decomposes.

3. The method of producing commercial anhydrous sodium bi-sulphite, which consists in subjecting commercial sodium carbonate to the action of substantially pure sulphur dioxide, admitted to contact with the substantially dry sodium salts only at such a rate that the temperature of the mass is retained below the temperature at which anhydrous sodium bi-sulphite decomposes.

4. The method of producing commercial anhydrous sodium bi-sulphite, which consists in subjecting commercial sodium carbonate in substantially dry form, while undergoing agitation, to the action of substantially pure sulphur dioxide in the presence of a trace of moisture.

5. The method of producing commercial anhydrous sodium bi-sulphite, which consists in subjecting commercial sodium carbonate in substantially dry form, while undergoing agitation, to the action of substantially pure sulphur dioxide, and simultaneously maintaining the temperature of the mass below the temperature at which anhydrous sodium bi-sulphite decomposes.

NAPOLEON ARTHUR LAURY.